March 30, 1943.     W. R. THOMPSON     2,315,143
ROASTING FORK
Filed Aug. 6, 1942
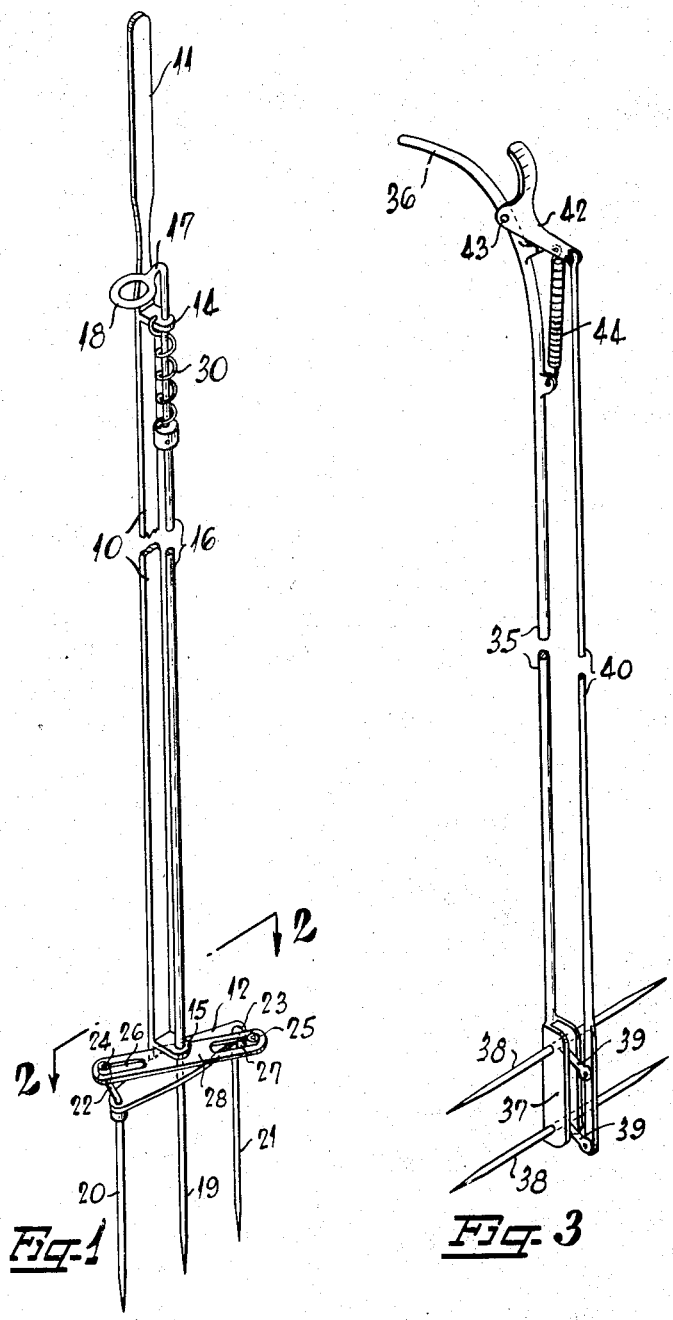
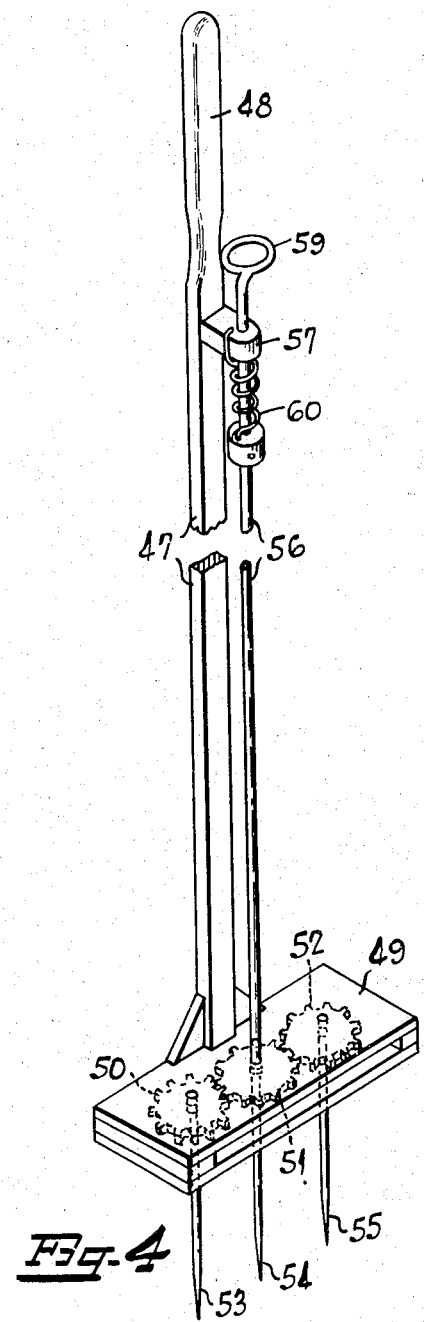
Walter R. Thompson
Inventor
Eaton + Brown
Attorneys Patented Mar. 30, 1943

2,315,143

UNITED STATES PATENT OFFICE 2,315,143

ROASTING FORK

Walter R. Thompson, Ruffin, N. C.

Application August 6, 1942, Serial No. 453,815

6 Claims. (Cl. 53—5)

This invention relates to roasting forks and more especially to an article of this character in which the tines are individually and axially rotatable so as to present different sides of the supported foodstuff to the fire. The present invention is particularly adaptable for use on picnics, wiener roasts and the like where an inexpensive and efficient utensil is desirable for supporting and turning the foodstuff in the proper positions relative to the fire and without causing discomfort to the user.

It is an object of this invention to provide a roasting fork comprising a handle, a plurality of tines for supporting foodstuff, and means carried by the handle for rotating each of said tines about its own axis.

It is another object of this invention to provide a roasting fork of the class described which is capable of being supported and operated by one hand of the user thereby leaving the other hand free. In other words, the fingers of one hand may be employed for gripping the handle of the fork while the thumb on the same hand may be employed for axially rotating the individual tines and associated foodstuff.

It is another object of this invention to provide a novel roasting fork which is simple in construction, economical to manufacture and easy to operate.

Some of the objects of the invention having been stated, others objects will appear as the description proceeds when taken in connection with the accompanying drawing in which:

Figure 1 is an isometric view of one form of my improved roasting fork;

Figure 2 is a sectional plan view taken along the line 2—2 in Figure 1;

Figure 3 is an isometric view of a modified form of roasting fork;

Figure 4 is an isometric view of still another modified form of roasting fork.

Referring more particularly to the drawing, the numeral 10 denotes a handle member, the upper end of which is adapted to be grasped by one hand of an operator as at 11, and the lower end having an outstanding tine or prong support 12 integral therewith. The handle 10 also has outstanding lugs 14 and 15 extending from one face thereof in which is rotatably mounted a rod 16. This rod 16 has its upper end turned laterally as at 17, said lateral portion having a loop 18 integral therewith which is adapted to be engaged by the thumb of the same hand which engages handle portion 11.

Rod 16 extends downwardly through the outstanding base member 12. The extension of this rod below the base member forms a tine or prong 19, which prong is preferably sharpened on its lower end to facilitate the reception of edible products such as wieners, meat, and the like. The base member 12 also has rotatably mounted therein a pair of adjacent tines or prongs 20 and 21, and these prongs have laterally projecting lever arms 22 and 23 respectively integral with the upper ends thereof.

The free ends of the levers 22 and 23 are equipped with rollers 24 and 25, said rollers being adapted to slidably penetrate slots 26 and 27 respectively in the opposed ends of another lever 28. Although rollers are employed on the ends of lever arms 22 and 23, it is evident that non-rotatable projections could be employed instead, and substantially the same results obtained because the function of the rollers lies principally in the elimination of friction.

The intermediate portion of lever 28 is fixedly secured around the lower portion of rod 16 at a point between the lug 15 and base member 12. In order to yieldingly hold the parts in such a position that the edge of lever 28 will normally abut the edge of handle 10 in the manner shown in Figure 2, a suitable torsion spring 30 is provided.

When it is desired to axially rotate the tines 19, 20, and 21, it is only necessary for the operator to grasp the handle portion 11 with the fingers of one hand and then insert the thumb of the same hand into loop 18. The operator can then move his thumb to oscillate the rod 16 and lever 28 back and forth from bold line position (Figure 2) to dotted line position to thereby impart simultaneous axial rotation to the tines and the edible products thereon.

Figure 3 shows a slightly modified form of the invention, but the same principle is employed. In this form, a handle 35 is provided and the upper end of this handle has a portion 36 which is adapted to be grasped by the user's fingers. The lower portion of handle 35 has a U-shaped portion 37 integral therewith, the legs of which are penetrated by transversely disposed tines 38, which tines have their opposed ends sharpened for the reception of edible products. Each of the tines has a laterally projecting lever 39 extending from its central portion at a point between the legs of U-shaped portion 37. The free ends of these levers are connected by a link 40 which extends upwardly alongside handle 35, and is connected to one leg of a bell crank 42, said bell crank being pivoted intermediate its ends as at 43 to handle 35.

When it is desired to simultaneously oscillate the tines 38, the operator usually engages handle portion 36 with the fingers of his hand and then applies pressure to the adjacent leg of bell crank 42 with the thumb of the same hand. The pressure exerted by the thumb will produce rotation of the tines 38 in one direction, and a tension spring 44 will produce rotation in the opposite direction to thereby return the parts to their normal position.

Figure 4 shows still another modified form of the invention, which is also similar in principle to the preceding forms, yet the specific details vary. This form has a handle 47 the upper end of which has a portion 48 which is adapted to be grasped by the user's fingers. The lower end of the handle has an outstanding base or support 49 in which is housed intermeshing gears 50, 51 and 52, fixedly mounted upon parallel tines 53, 54, and 55 respectively. It is therefore seen that when rotation is imparted to one tine, a corresponding rotation will be imparted to the remaining tines.

Extending upwardly from the center gear 51 and forming an extension of tine 54 is a rod 56. This rod has its upper end rotatably mounted in a lug 57 which, in turn, projects from the upper portion of handle member 47. The upper projecting end of the rod 56 has a laterally disposed loop 59 integral therewith. This loop is adapted to be engaged by the thumb of the operator's hand while the fingers of the same hand are engaging the handle portion 48. A torsion spring 60 is employed for returning the tines and associated parts to their normal position after the user's thumb has rotated the rod 56 and loop 59 in a clockwise manner in Figure 4. In other words, oscillation is imparted to the tines in one direction by the movement of the thumb and the reverse oscillation is imparted to the tines by means of torsion spring 60.

It is therefore seen that I have provided a simple utensil capable of being operated by one hand to thereby expose all surfaces of foodstuff to the fire without bodily turning the utensil.

In the drawing and specification, there has been set forth a preferred embodiment of the invention, and although specific terms are employed, they are used in a generic and descriptive sense only and not for purposes of limitation, the scope of the invention being defined in the claims.

I claim:

1. A roasting fork comprising an elongated handle, one end of which is adapted to be gripped by the fingers of an operator's hand, a plurality of elongated tines carried by the other end of said handle, each tine being mounted for rotation along its longitudinal axis, and means connecting said tines and engageable by the thumb of said operator's hand for rotating said tines along their longitudinal axis.

2. A roasting fork comprising an elongated handle, one end of which is adapted to be gripped by the fingers of an operator's hand, a plurality of elongated tines carried by the other end of said handle, each tine being mounted for rotation along its longitudinal axis, interconnecting levers for transmitting rotation from one tine to the adjacent tine, and operating means connecting said levers and engageable by the thumb of the operator's hand whereby said tines may be axially rotated each along its own longitudinal axis by the movement of the thumb.

3. A roasting fork comprising an elongated handle, one end of which is adapted to be gripped by the fingers of an operator's hand, a plurality of elongated tines carried by the other end of said handle, each tine being rotatable along its own longitudinal axis, a geared connection between said tines, and operating means for said gears and engageable by the thumb of the operator's hand to rotate each of the tines along its own longitudinal axis.

4. A roasting fork comprising an elongated handle, one end of which is adapted to be gripped by the fingers of an operator's hand, a plurality of elongated tines carried by the other end of said handle, each tine being mounted for rotation along its longitudinal axis, means connecting said tines and engageable by the thumb of said operator's hand for rotating said tines along their longitudinal axis, and a spring for resisting movement of the means engageable by the thumb of the operator's hand for holding the tines in a given position and for returning the tines to said given position when the means engageable by the thumb of the operator's hand are released.

5. A roasting fork comprising an elongated handle, one end of which is adapted to be gripped by the fingers of an operator's hand, a plurality of elongated tines carried by the other end of said handle, each tine being mounted for rotation along its longitudinal axis, interconnecting levers for transmitting rotation from one tine to the adjacent tine, operating means connecting said levers and engageable by the thumb of the operator's hand whereby said tines may be axially rotated each along its own longitudinal axis by the movement of the thumb, and a spring for resisting movement of the means engageable by the thumb of the operator's hand for holding the tines in a given position and for returning the tines to said given position when the means engageable by the thumb of the operator's hand are released.

6. A roasting fork comprising an elongated handle, one end of which is adapted to be gripped by the fingers of an operator's hand, a plurality of elongated tines carried by the other end of said handle, each tine being rotatable along its own longitudinal axis, a geared connection between said tines, operating means for said gears and engageable by the thumb of the operator's hand to rotate each of the tines along its own longitudinal axis, and a spring for resisting movement of the means engageable by the thumb of the operator's hand for holding the tines in a given position and for returning the tines to said given position when the means engageable by the thumb of the operator's hand are released.

WALTER R. THOMPSON.